G. SELDEN.

CIGAR LIGHTER.

No. 10,200. Reissued Sept. 19, 1882.

WITNESSES
Franck L. Durand
R. M. Smith

INVENTOR
George Selden
by A. M. Smith
Attorney

N. PETERS, Photo-Lithographer, Washington, D. C.

UNITED STATES PATENT OFFICE.

GEORGE SELDEN, OF ERIE, PENNSYLVANIA.

CIGAR-LIGHTER.

SPECIFICATION forming part of Reissued Letters Patent No. 10,200, dated September 19, 1882.

Original No. 206,835, dated August 6, 1878. Application for reissue filed August 14, 1882.

*To all whom it may concern:*

Be it known that I, GEORGE SELDEN, of Erie, county of Erie, and State of Pennsylvania, have invented certain new and useful Improvements in Cigar-Lighters, of which the following is a full, clear, and exact description, reference being had to the accompanying drawings, making a part of this specification, in which—

Figure 1:
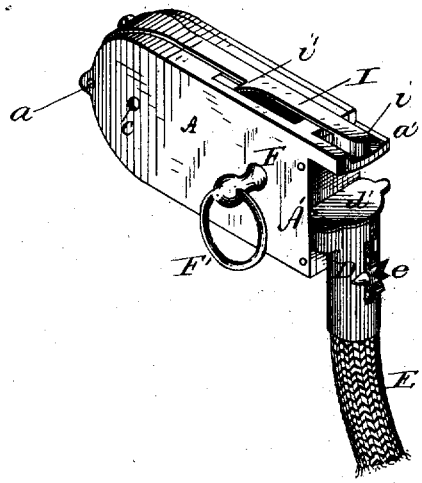
Figure 2:
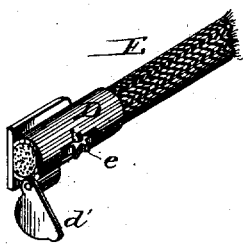
Figure 3:
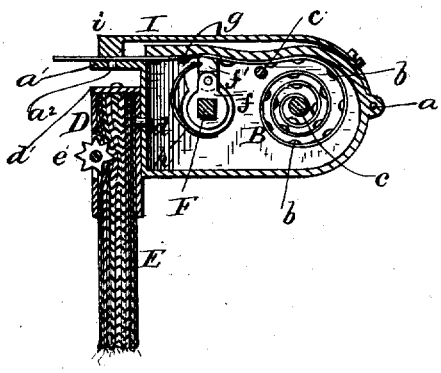
Figure 4:
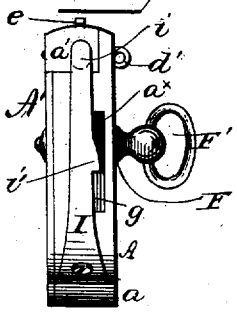

Figure 1 is a perspective view of my improved cigar-lighter. Fig. 2 is a similar view of the wick tube or holder detached. Fig. 3 represents the cigar-lighter in section, showing a mechanism for feeding and igniting the percussion tape or pellets; and Fig. 4 is a plan or top view of the lighter.

My invention relates to a lighting device adapted to be carried in the pocket for convenience in lighting pipes, cigars, &c.; and it consists in the combination, with a case or shell inclosing and protecting a percussion-tape or repeating-match for lighting a wick, of a wick-holder, and means for feeding out and igniting the percussion-pellets for lighting the wick, and to certain details of construction and arrangement of the parts above named, as hereinafter explained.

In the accompanying drawings, A represents a shallow metallic box or case of any suitable design or configuration, that shown being a convenient one for the purpose named. One side of this case is made in the form of a removable cover for permitting access to the interior of the case and the introduction of the repeating-match or percussion-pellets, which are here shown applied to a narrow tape, B, rolled up into a coil and surrounding a central pin or roller, C, around which it passes in being fed outward through an opening in the shell, guided and upheld against the upper or edge wall of the shell by a second pin or roller, $c'$. The forward end of the shell adjacent to the slot or opening through which the repeating-match is fed outward is provided with a lip, apron, or nose-piece, $a'$, over which the percussion tapes or pellets are fed as they pass out of the inclosing case, said lip forming an anvil on which the pellets are exploded.

D is a wick tube or holder arranged in such relation to the lip or anvil $a'$ that the end of a wick, E, passing out of said holder to be ignited by the percussion-pellets, can be brought into sufficiently close proximity with said pellets to be ignited thereby when the pellets are exploded. The wick-holder is provided with a cap or cover, $d'$, adapted to be removed or withdrawn when the wick is to be ignited, but which serves, by excluding the air, to extinguish the wick and protect it when not in use. By the arrangement described the wick and the repeating-match or percussion-tape are separated from each other, each having its own compartment or holder, from which they pass out to be ignited. The wick may be fed out of the holder to be ignited for use and drawn in again for extinguishing it by any suitable device, a star-wheel being shown in the drawings for that purpose. The means shown for feeding the percussion-pellets out and igniting them are as follows:

F represents a transverse shaft mounted in suitable bearings in the side walls of the case in front of the tape B, and squared between its bearings to adapt it to receive and impart motion to two arms, $f$ and $g$, mounted thereon. The arm $f$ has a pivoted extension or pawl, $f'$, reaching to within close proximity with the upper wall of the case, A, and pressing the tape B snugly against the same. This pawl is pivoted in such manner as to allow it a forward movement relative to its supporting-arm $f$, but is held against backward deflection by shoulders at the joint, connecting it with said arm, a spring, $h$, serving to prevent the forward deflection of the pawl except to permit it to pass over the pellets $b$ in its backward or return movement. The end of the pawl is rounded on its rear face to facilitate its backward movement over the percussion-pellets, as explained. The arm $g$ is made of sufficient length to pass through a slot, $a^{\times}$, in the upper wall of the case, and is made in the form of a cam, adapting it to act on the hammer, which explodes the percussion-pellets, as follows:

I represents a flat spring, rigidly secured at its rear end to the rear end of the case, said spring resting upon the upper wall of the case and overhanging at its forward end the projecting lip or anvil $a'$, where it is provided with the hammer $i$, resting upon said anvil directly over a perforation, $a^2$, therein.

The spring I about midway of its length is provided with a lip or spur, $i'$, which overhangs the slot $a^{\times}$, in which the arm $g$ moves, said spur being inclined on its forward face to permit the arm $g$ to crowd it to one side of the slot in the backward movement of said arm, the spring I yielding laterally to permit the passage of the arm by the lip or spur without raising the spring and hammer. The percussion-tape passes out of the case A through a slot at its upper front corner, over the anvil $a'$, and underneath the hammer $i$, and is fed forward by the pawl $f'$, resting against the rear face of one of the pellets, which thus acts as a tooth for propelling the tape forward, while the arm $g$, acting by the same movement on the lip $i'$ of the spring I, lifts the hammer $i$ out of frictional contact with the tape B, thus permitting the feeding movement of the tape. By this arrangement the percussion-pellets are successively fed forward until they rest upon the lip or anvil, when the cam-arm $g$ escapes from the lip $i'$, and the hammer $i$ is caused by the spring I to descend thereon with sufficient force to explode the pellet, the fire from which passes to and ignites the wick.

Motion is imparted to the arms $f$ and $g$ by means of a thumb-piece extension of the shaft F or a ring, F', attached to a projecting end of said shaft, and adapted to fold out of the way against the side wall of the case A, or within a socket or recess formed therein. The wick-tube D may be hinged to the lower corner or face of the case in such way as to adapt it to fold from the position shown in Figs. 1 and 3 against the lower wall of the case. The wick or punk may be of any suitable material that is easily ignited and adapted to the purpose described. The percussion-tape is placed in the case with the pellets on its inner or lower side, as shown, for facilitating feeding forward of the same.

In preparing the tape it may, if desired, be saturated in transverse lines, crossing the pellets of fulminate, with a solution of saltpeter or some equivalent therefor, so that when one of the pellets is exploded the tape will burn across on said line, allowing the end to drop off.

Having now described my invention, I would state that I do not restrict myself to any specific form or arrangement of parts, nor to any specific mechanism for feeding out and igniting the repeating-match or percussion-tape, as it will be obvious that these may be modified; but those described serve to show how the invention may be carried out in practice.

What I claim is—

1. The combination, in a pocket lighting device, of a wick-holder, a percussion-tape holder, and means for feeding and igniting the tape.

2. The combination, in a pocket lighting device, of a wick-holder, a wick movable in said holder, a percussion-tape for igniting said wick, and mechanism for feeding and igniting said tape.

3. The combination, in a pocket lighting device, of a wick-holder, a wick movable longitudinally in said holder, a compartment or holder inclosing a percussion-tape, and mechanism for feeding and igniting said tape.

4. The combination, in a pocket lighting device, of a percussion-tape holder, mechanism for feeding and igniting the tape, a wick-holder, and means whereby the moving or feeding of the wick outwardly may be effected by the user without grasping or touching the wick.

5. In a pocket lighting device, a box or case for inclosing percussion-pellets, in combination with a wick duct or holder, and mechanism capable of operation from the exterior of the case for feeding and igniting the percussion-pellets.

6. In a pocket lighting device, the case A for inclosing a repeating match or tape, provided with pellets of fulminate, in combination with a wick tube or holder, D, hinged to said case.

7. The case A, provided with a perforated anvil, $a'$, and the spring and hammer I, operating substantially as and for the purpose set forth.

8. The shaft F, provided with arms $f f'$ and $g$, in combination with the tape having pellets of fulminate, and the hammer for exploding the same, substantially as described.

In testimony whereof I have hereunto set my hand this 30th day of November, 1881.

GEO. SELDEN.

Witnesses:
JNO. H. BLISS,
J. F. MCCONNELL.